United States Patent

Ozeki et al.

[11] Patent Number: 5,190,408
[45] Date of Patent: Mar. 2, 1993

[54] METHOD OF LAYING UNDERGROUND CABLES

[75] Inventors: Shotaro Ozeki; Masakazu Kawanabe, both of Fukuoka, Japan

[73] Assignee: Saito Denki Sangyo Co., Ltd., Fukuoka, Japan

[21] Appl. No.: 765,578

[22] Filed: Sep. 25, 1991

[30] Foreign Application Priority Data

Sep. 27, 1990 [JP] Japan .............................. 2-101990[U]

[51] Int. Cl.⁵ ............................................. H02G 3/18
[52] U.S. Cl. ..................................... 405/154; 174/37; 174/65 R; 220/38; 285/129; 285/161; 285/208
[58] Field of Search ................. 405/154; 285/128, 129, 285/161, 192, 205, 206, 208; 174/37, 65 R; 220/3.2, 3.8

[56] References Cited

U.S. PATENT DOCUMENTS

| | | | |
|---|---|---|---|
| 525,670 | 9/1894 | Segade et al. | 174/65 R |
| 1,857,197 | 5/1932 | Knoderer | 174/65 R |
| 2,950,837 | 8/1960 | Christensen et al. | 220/3.8 X |
| 3,181,899 | 5/1965 | McKnight | 285/161 |
| 4,151,363 | 4/1979 | Nichols | 285/161 X |
| 4,224,464 | 9/1980 | Bunnell et al. | 174/65 R |

FOREIGN PATENT DOCUMENTS 2023651 11/1971 Fed. Rep. of Germany .... 174/65 R

Primary Examiner—Randolph A. Reese
Assistant Examiner—Arlen L. Olsen
Attorney, Agent, or Firm—Morrison Law Firm

[57] ABSTRACT

Underground cables are laid in a concrete box which is to be buried in the ground. According to the present invention, an adapter is formed with a hole, and a bushing is mounted on the adapter through the hole. Subsequently, a cable duct is fitted into the bushing, and the resultant adapter is attached to the concrete box so as to conceal an opening provided in the concrete box beforehand.

10 Claims, 2 Drawing Sheets

METHOD OF LAYING UNDERGROUND CABLES

BACKGROUND OF THE INVENTION

1. Field of the Invention

The present invention a method for laying underground cables. More particularly, it relates to a method for laying a cable duct in a concrete distributing box at the construction site.

2. Description of the Prior Art

A distributing box in which underground cables are disposed, is usually made of concrete. In burying the distributing box in the ground, an insertion hole is provided in the side wall of this box by an electric drill or the like, and a cable duct is inserted into the insertion hole.

Since the distributing box is constructed of concrete to be rigid, the prior-art method requires extensive labor time on the provision of the insertion hole. In addition, after the cable duct has been inserted into the insertion hole, this insertion hole is coated and filled up with mortar or the like. In this case, defects in the execution are likely to occur because some the mortar disperses.

OBJECTS AND SUMMARY OF THE INVENTORS

It is accordingly an object of the present invention to provide a method of laying underground cables, which eliminates the problems of the prior art stated above.

The present invention comprises the steps of forming a hole (6) in a distributing adapter (3), passing a bushing (10) through said hole (6) and fixing it with a nut (11) so as to be supported on said adapter (3) by a flange of, said bushing (10), fitting a cable duct (12) into an un-threaded hole in said bushing (10), and attaching said adapter (3) with bolts embedded in a wall (5) so as to conceal a recessed opening (4) provided in a concrete box (1) beforehand.

With this method, at site of construction the hole (6) is formed in the adapter (3) by a tool such as electric drill, the bushing (10) is mounted to pass through the hole (6), and the cable duct (12) is fitted into the bushing (10), whereby the cable duct (12) in which underground cables are inserted can be easily laid in the distributing box (1).

BRIEF DESCRIPTION OF THE DRAWINGS

The drawings illustrate an embodiment of the present invention, in which.

DETAILED DESCRIPTION OF THE PREFERRED EMBODIMENT

An embodiment of the present invention will now be described with reference to the drawings.

Figure 1:
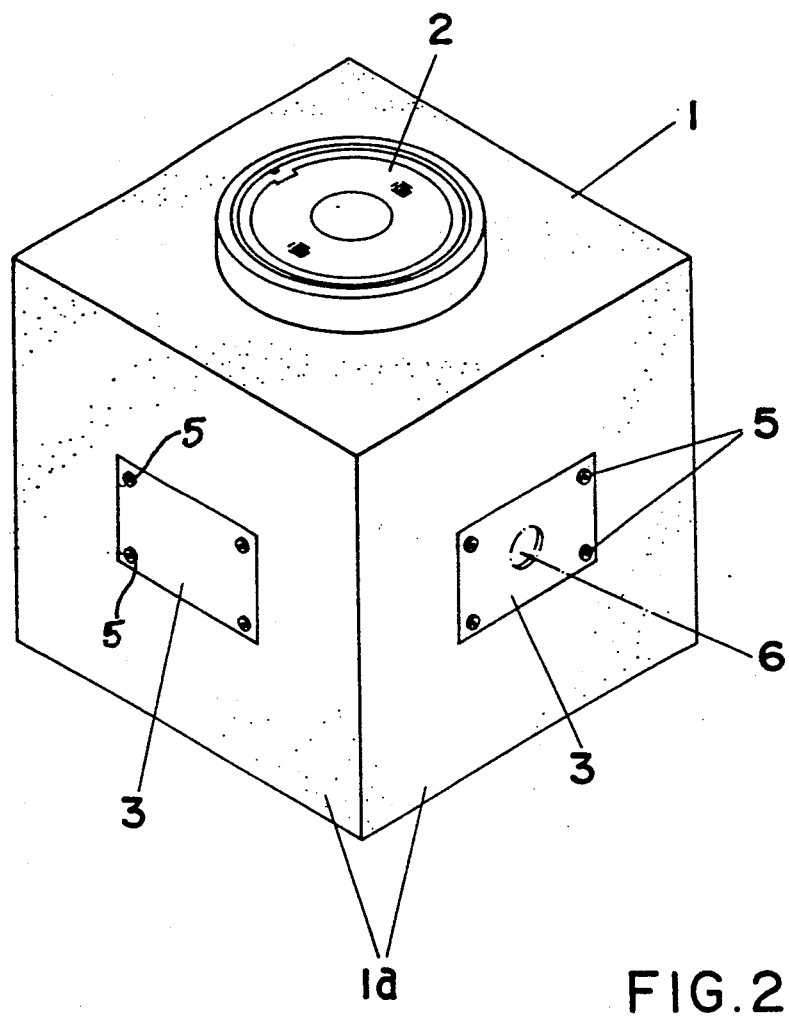
FIG. 1 is a perspective view of a distributing box for use in the embodiment.

FIG. 1 is a perspective view of a distributing box employed in the embodiment. The distributing box is fabricated of a concrete box 1 to be rigid. A cover 2 is placed on the upper surface of the box 1, and it is exposed to the surface of the ground in which the box 1 is buried in the ground.

Figure 2:
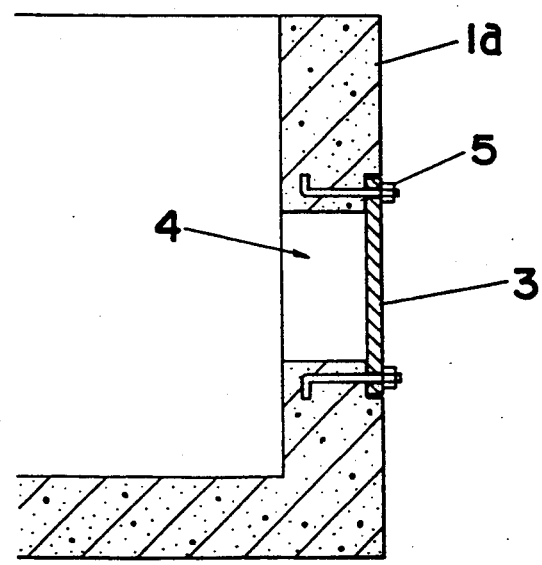
FIG. 2 is a partial sectional view of the distributing box showing the attached state of a distributing adapter.

Numeral 3 designates a distributing adapter which is mounted on the wall 1a of the box 1. The adapter 3 is made of a plate such as synthetic resin plate or metal plate, and is attached by bolts 5 so as to conceal an opening 4 provided in the wall 1a (refer also to FIG. 2).

Figure 3:
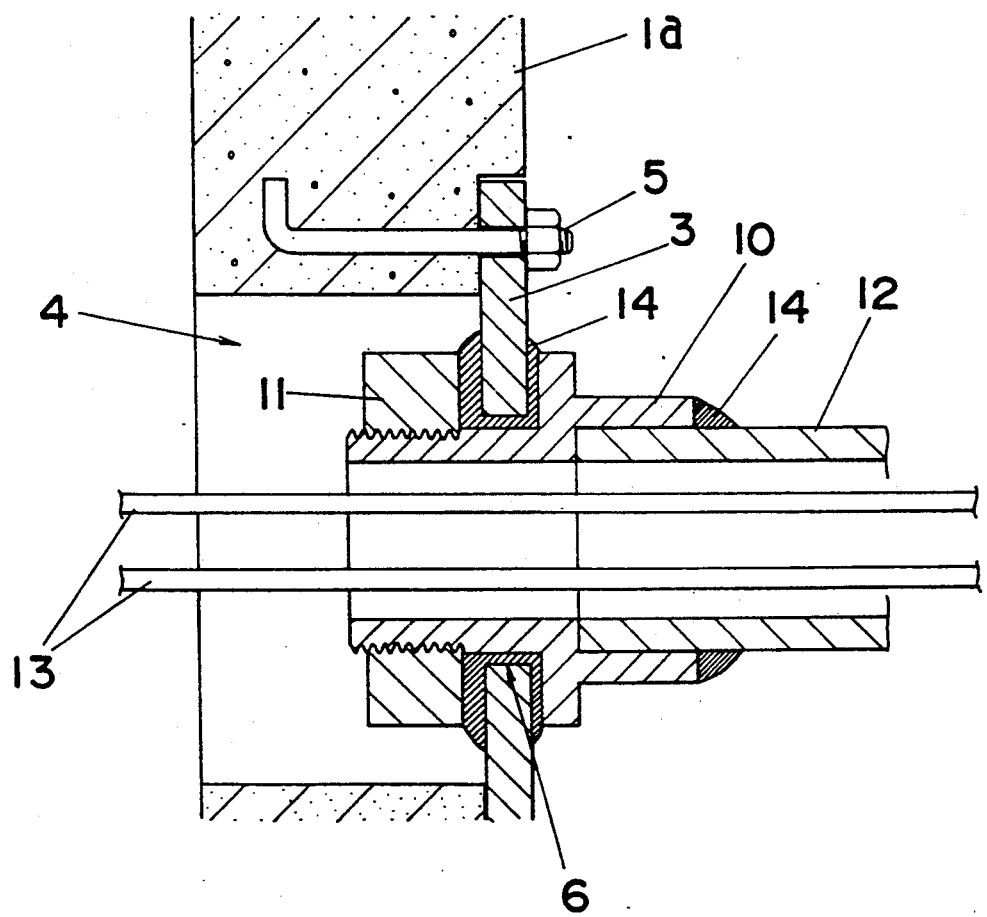
FIG. 3 is a partial sectional view showing the finished state of a duct laying work.

Next, a method of laying a cable duct will be described in conjunction with FIG. 3. At construction site, a hole 6 (refer also to FIG. 1) is provided in the adapter 3 by an electric drill. Subsequently, a pipe bushing 10 having a flange is passed through the hole 6 so as to be supported on the adapter 3 by the flange, and it is fixed to the adapter 3 by a nut 11. Next, a cable duct 12 is fitted into the bushing 10. Underground cables, shown at numeral 13, are inserted in the cable duct 12. Finally, the resultant adapter 3 is attached by the bolts 5 so as to conceal the opening 4 of the concrete box 1.

After laying work, the duct suitable places are coated with a bonding material 14 to seal the opening 4. If necessary, sealing means such as a "U" shaped packing is retained, thereby preventing underground water from invading the interior of the concrete box 1.

In this manner, according to the the present invention, the cable duct 12 can be easily laid in the concrete box 1 at the construction site.

As described above, the present invention consists of providing a hole in an adapter, passing a bushing through the hole, fitting a cable duct into the bushing, and attaching the resultant adapter so as to conceal an opening formed in a concrete box. Therefore, the cable duct is easily laid at the construction site. Moreover, it is possible to eliminate a dispersion in the state of finish depending upon the degree of skill in the execution of the duct laying work.

What is claimed is:

1. A method of laying underground cables in a distributing box comprising:

casting said distributing box out of concrete;

forming an opening in a wall of said distributing box;

recessing said opening thus forming a recessed area;

embedding fastening means in said wall within said recessed area;

forming a hole in a distributing adapter;

passing a bushing through said hole;

fixing said bushing with a nut so as to be supported on said adapter by a flange of said bushing;

said bushing having an un-threaded hole for fitting a cable duct into said bushing; and attaching said distributing adapter with said fastening means over said opening and within said recessed area, wherein said underground cables are inserted in said cable duct.

2. A method of laying underground cables as defined in claim 1, further comprising the step of coating at least a gap between said bushing and said adapter with a bonding material after the attachment of said adapter.

3. A method of laying underground cables as defined in claim 1, further comprising the step of retaining a packing on a side of said adapter on which said nut is to be brought into threadable engagement with said bushing, before fixing said bushing with said nut.

4. The method of claim 3 wherein the packing has a cross section which generally has a "U" shape..

5. A method of laying underground cables as defined in claim 1, wherein said distributing adapter is a member selected from the group consisting of a synthetic resin plate and a metal plate.

6. A distributing box for underground cables comprising:

a concrete side wall having an opening;

said opening being recessed on an outside surface of said concrete side wall and thus having a recessed area around it;

fastening means embedded in said recessed area;

a distributing adapter having a hole it in;

said distributing adapter being mounted in said recessed area by said fastening means and covering said opening;

a bushing having threads;

a threaded fastening means mating with said threads of said bushing and securing said bushing in said hole; and said bushing having an un-threaded hole adapted to receive a conduit means.

7. The distributing box for underground cables according to claim 6 wherein said distributing adapter is formed of one of a synthetic resin plate or a metal plate.

8. The distributing box for underground cables according to claim comprising a means for sealing said busing and said distributing adapter.

9. The distributing box for underground cables according to claim 6 wherein said means for sealing includes one of a packing material or a bonding material.

10. The distributing box of claim 6 wherein said fastening means are bolts having first ends embedded in said concrete and second ends passing through holes in said adapter plate.

* * * * *